United States Patent [19]
Cloos

[11] 4,333,594
[45] Jun. 8, 1982

[54] PLANET GUIDE ROLLER FEED ARRANGEMENT FOR MELTING WELDING WIRES

[75] Inventor: Erwin Cloos, Haiger, Fed. Rep. of Germany

[73] Assignee: Carl Cloos Verwaltungsgesellschaft oHG, Haiger, Fed. Rep. of Germany

[21] Appl. No.: 138,060

[22] Filed: Apr. 7, 1980

[30] Foreign Application Priority Data

Apr. 14, 1979 [DE] Fed. Rep. of Germany ....... 2915320

[51] Int. Cl.³ .......................................... B65H 17/22
[52] U.S. Cl. ..................................... 226/176; 226/181
[58] Field of Search ................... 226/90, 91, 168, 174, 226/176, 177, 181, 184, 187; 414/432

[56] References Cited

U.S. PATENT DOCUMENTS

| | | | |
|---|---|---|---|
| 3,009,619 | 11/1961 | Layden | 226/184 |
| 3,331,545 | 7/1967 | Olivieri | 226/187 |
| 3,430,832 | 3/1969 | Meyer | 226/174 |
| 4,049,172 | 9/1977 | Samokovliski et al. | 226/90 |
| 4,150,772 | 4/1979 | Auer | 226/90 |

*Primary Examiner*—Leonard D. Christian
*Attorney, Agent, or Firm*—Blanchard, Flynn, Thiel, Boutell & Tanis

[57] ABSTRACT

A planet guide roller welding wire feeding arrangement having at least two planet guide rollers rotatably mounted on a bearing part with the axes of rotation thereof defining an angle with the welding wire axis and are arranged radially outwardly from the welding wire axis. The bearing part encircles the welding wire and is supported for rotation with respect to the welding wire. The bearing part consists of a cylindrical sleeve having a slotted wall structure so that at least two parts thereof are movable toward and away from each other. The guide rollers are rotatably mounted on these two movable parts so that the guide rollers can be adjustably moved toward and away from each other. Structure is provided for facilitating the adjusting of the guide rollers toward and away from each other, which structure is responsive to a relative axial movement between a gripping member encircling the bearing part and selectively fixedly secured thereto.

13 Claims, 8 Drawing Figures

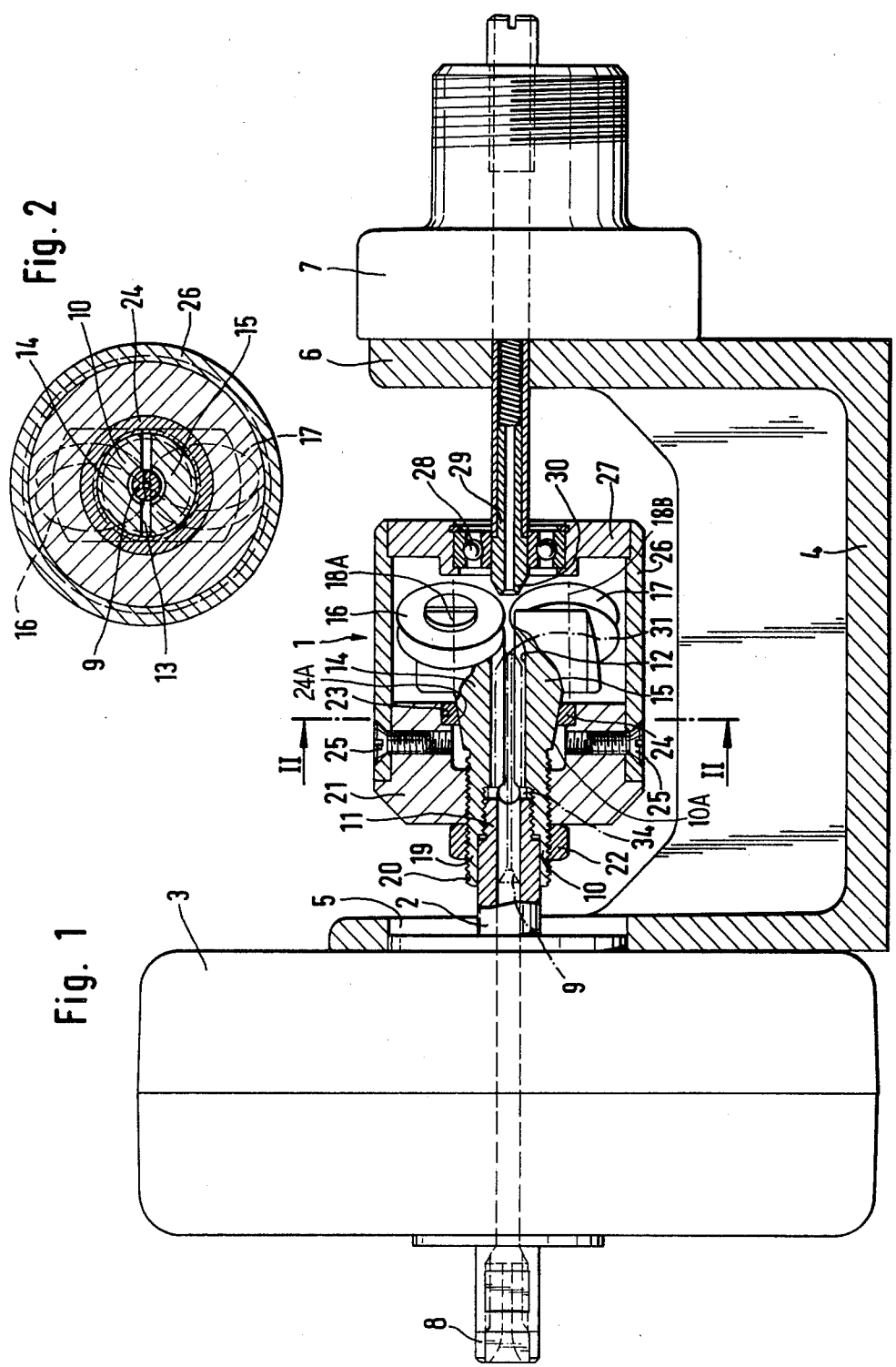

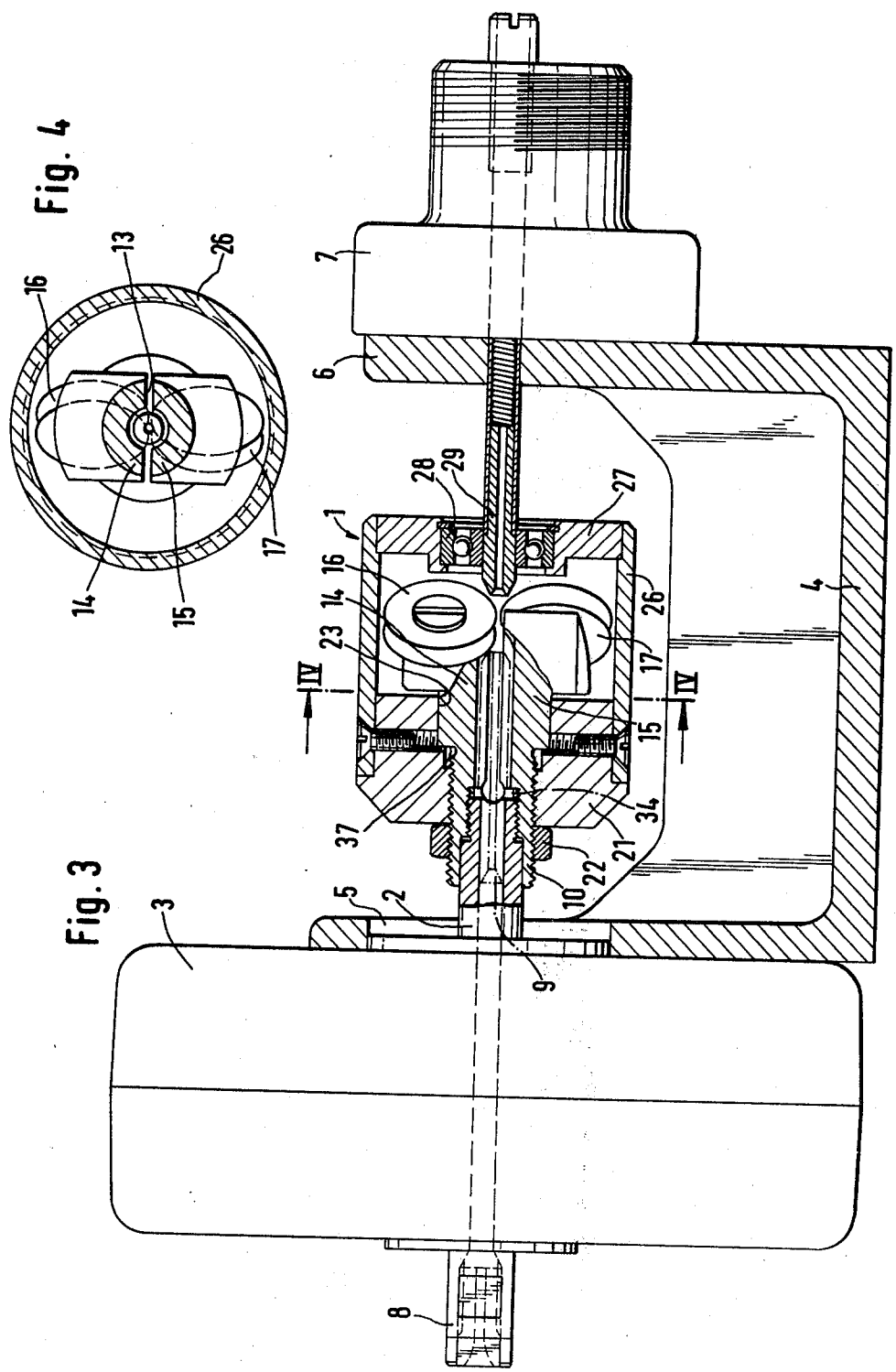

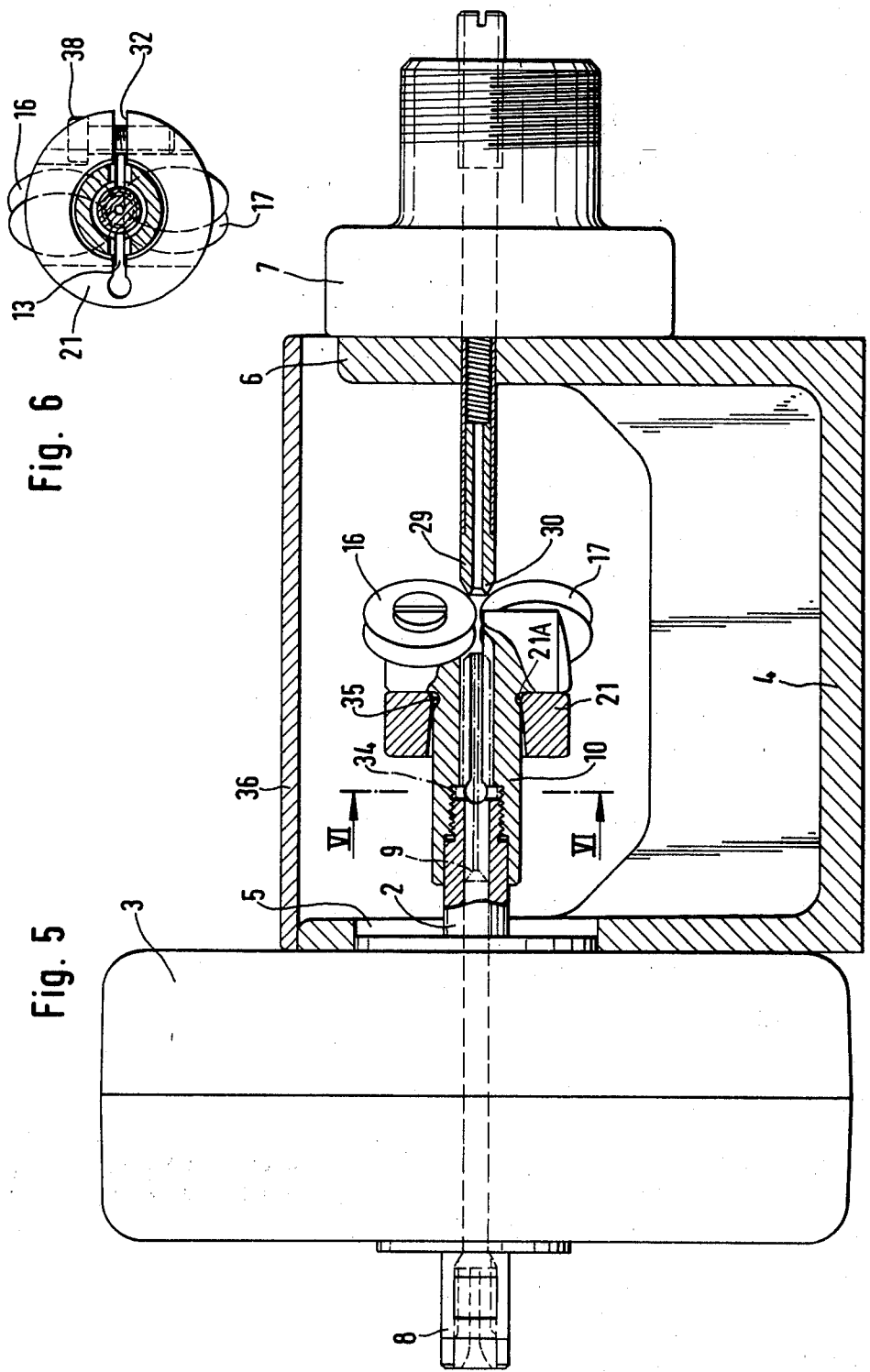

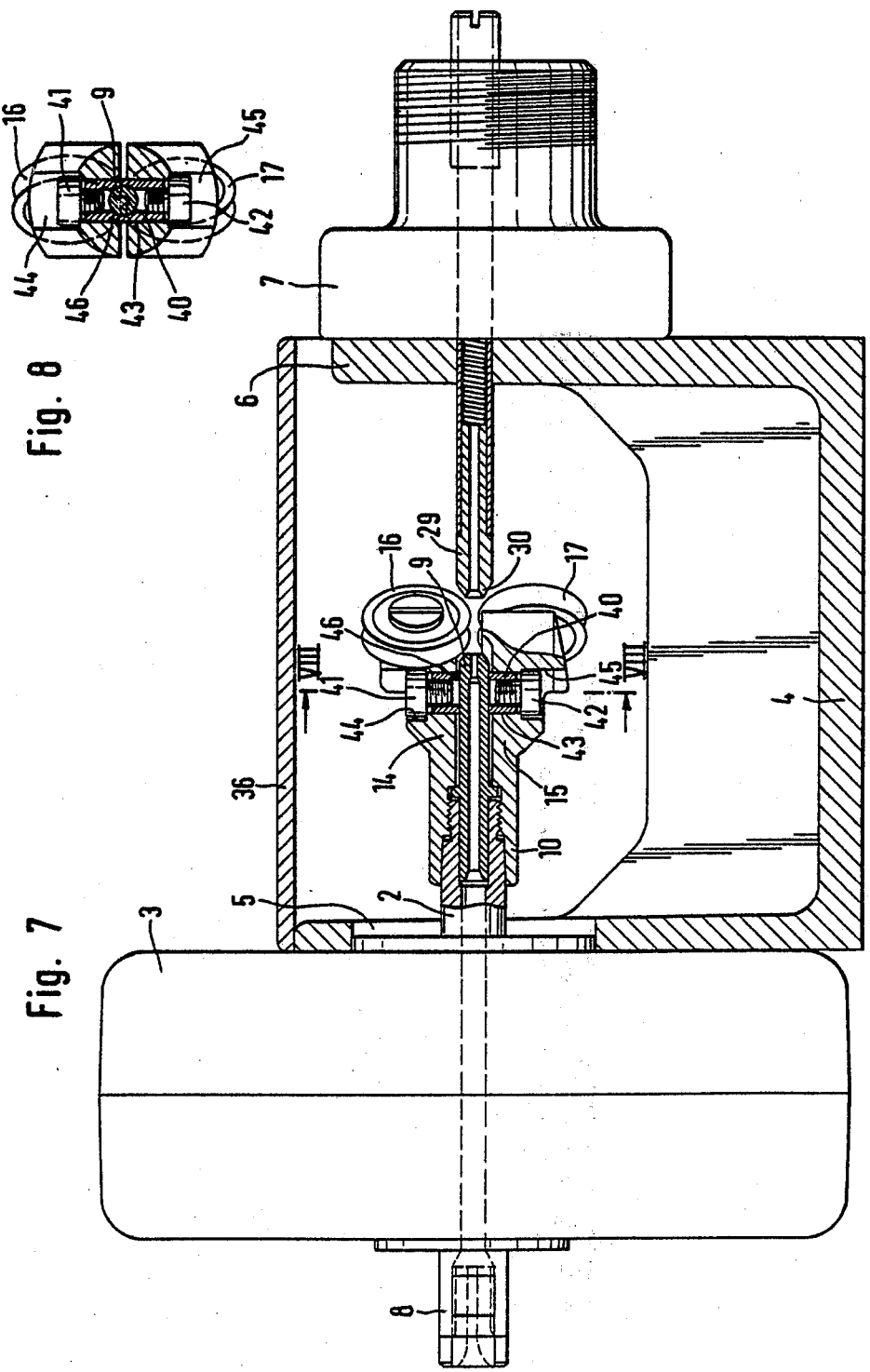

PLANET GUIDE ROLLER FEED ARRANGEMENT FOR MELTING WELDING WIRES

FIELD OF THE INVENTION

The invention relates to a planet guide roller feed arrangement for melting welding wires having at least two planet guide rollers, the axes of which define an angle with the welding-wire axis and are arranged radially to the welding wire on a bearing part which rotates around the welding wire and is driven by a motor shaft, and are urged under initial tension against the surface of the welding wire.

BACKGROUND OF THE INVENTION

A linear drive arrangement of the above-mentioned type is for example known from German Pat. No. 20 55 721. The planet guide rollers rest under pressure on the surface of the wire and rotate in a plane which is at a right angle with respect to the axis of rotation. Since the planet guide rollers define an angle with the wire axis, the wire is moved forwardly by the rotating planet guide rollers. The guide roller holders of the known planet guide roller feed arrangement are constructed as pistons and are supported on a conical cylinder surface of an adjusting nut which can be rotated about the welding wire. The adjusting nut can be moved axially in direction of the axis of rotation. With this an even feed of the planet guide rollers through one single adjusting nut is achieved.

From German GM No. 76 20 049 it is furthermore known to arrange the planet guide rollers on a two-arm lever, the other end of which slides on a tensioning cone ring, which is also rotatable about the axis of the wire and can be moved in axial direction with respect to the wire axis. The tensioning cone ring is biassed by a spring in axial direction, through which the centrifugal forces are to be compensated and a reproducible contact pressure is to be obtained for each wire diameter.

These known planet guide roller feed arrangements are on the one hand relatively complicated in structure and thus expensive to manufacture and require on the other hand during each new insertion of the welding wire considerable adjusting operations. Thus, for example, in the case of a planet guide roller feed arrangement according to German Gebrauchsmuster No. 76 20 049, a nut must be rotated every time, which causes the planet guide rollers to be moved away from one another, so that the wire can be moved in place. Then the new adjustment of the contact pressure occurs. The same is true for a planet guide roller feed arrangement according to German Pat. No. 20 55 721.

The basic purpose of the invention is to construct a planet guide roller feed arrangement of the above-mentioned type so that same is extremely simple in structure and thus inexpensive in the manufacture and requires only a small input for the adjustment of the planet wheels.

This purpose is inventively attained by the bearing part consisting of a sleeve which is slotted in axial direction over the important part of its length, by arranging on each part of the slotted end of the bearing part a planet guide roller and by the feed of the bearing part and thus of the planet guide rollers occurring through an axial movement of the bearing part relative to a gripping member which encloses same. According to a further solution of the invention, the gripping member consists of a guide ring, wherein the feed of the planet guide rollers occurs by reducing the diameter of the guide ring.

An inventive planet guide roller feed arrangement can be manufactured inexpensively due to its simple structure so that it is economically acceptable to use a planet guide roller feed arrangement only for a narrowly limited range of diameters. The exchange of the entire planet guide roller feed arrangement during a changing of the welding-wire thickness is then more advantageous with respect to expense than the time-consuming adjustment of the planet guide roller feed arrangement to the new welding-wire thickness. An inventive planet guide roller feed arrangement is adjusted by the manufacturer to a predefined range of welding-wire diameters. The user no longer has to make an adjustment.

In order to design the basic adjustment of an inventive planet guide roller feed arrangement as simply as possible, a gripping member has advantageously a precisely defined internal bore and the bearing piece, more exactly the part of the bearing piece which forms a clamping sleeve, has a precisely defined outside diameter. To adjust the planet guide roller feed arrangement, it is only necessary to suitably choose the inside diameter of the gripping member and the outside diameter of the bearing piece. In case that a guide ring is used for the adjustment of the planet guide rollers, it is possible to make the adjustment easier by choosing the guide ring in such a manner that at a maximum possible feed the desired contact pressure of the planet guide rollers on the welding wire is just achieved.

BRIEF DESCRIPTION OF THE DRAWINGS

One exemplary embodiment of the invention is described hereinbelow in greater detail with reference to the drawings, in which:

FIG. 1 is a side view, partially cross-sectioned, of an inventive planet guide roller feed arrangement having a connected motor and fastening mechanism for the hose package;

FIG. 2 is a cross-sectional view taken along the line II—II of FIG. 1;

FIG. 3 is a partially cross-sectioned further embodiment of a planet guide roller feed arrangement according to the invention;

FIG. 4 is a cross-sectional view taken along the line IV—IV of FIG. 3;

FIG. 5 is a partially cross-sectioned further exemplary embodiment of a planet guide roller feed arrangement according to the invention;

FIG. 6 is a cross-sectional view taken along the line VI—VI of FIG. 5;

FIG. 7 is a partially cross-sectioned further exemplary embodiment of a planet guide roller feed arrangement; and FIG. 8 is a sectional view taken along the line VIII—VIII of FIG. 7.

DETAILED DESCRIPTION

A linear drive arrangement 1 is secured in FIG. 1 to a hollow shaft 2 of a motor 3. The motor 3 itself is bolted onto a U-shaped flange 4, through the opening 5 in one leg thereof extends the shaft 2. A connecting piece 7 for a hose package, which is not illustrated in any further detail, is secured to the opposite leg 6 of the flange 4, on the end of which hose package is, in a conventional manner, mounted a welding gun.

The welding wire (not illustrated) which is to be transported with the help of the linear drive or the planet guide roller feed arrangement 1 is introduced through a guide piece 8 into the hollow shaft 2 and extends from the guide piece 8 into a nozzle 9 which is inserted into the shaft 2. The nozzle 9 has a flange 34 and is supported with the help of a bearing part 10. The bearing part 10 is threadedly engaged with an end segment 11 of the hollow shaft 2, which end segment has an external thread and thus is fixedly connected against rotation with the hollow shaft.

The bearing part 10 has a central bore 12 therethrough in which is received the nozzle 9 which extends through the bearing part. The bore 12 is substantially larger than is necessary for receiving the nozzle 9 therein. As can particularly be seen from FIG. 2, the bearing part 10 has in its front region and extending in axial direction over a considerable part of its length a slot 13, as a result of which the bearing part 10 is divided in its front region into two arms or halves 14 and 15. The planet guide roller 16 is rotatably supported on an axis 18A on the half 14 of the bearing part 10 and the planet guide roller 17 is rotatably supported on an axis 18B on the half 15. The planet guide rollers 16 and 17 are thus fixedly connected against rotation to the bearing part 10 and thus to the hollow shaft 2.

The planet guide rollers 16 and 17 are located at circumferentially spaced locations about the axis of the bearing part 10 and the not illustrated welding wire. The axes of the rollers 16 and 17 are skewed at acute angles with respect to the axis of the bearing part 10 and the not illustrated welding wire.

An external thread 20 is provided on the end 19 of the bearing part 10 adjacent the motor 3. A gripping member 21 has a central opening 21A therethrough receiving the external thread therein, which gripping member is held in place with the help of a nut 22, which is threadedly engaged with the thread 20 on the bearing part 10.

The gripping member 21 also has an internal bore 23 concentric with the axis of the central opening 21A and receiving a ring 24 therein. The internal surface 24A of the ring 24 is conically shaped. The outer surface of the bearing piece 10 has a conically shaped surface segment 10A in the region of the slot 13 and at a conical angle which corresponds to the conical angle of the surface 24A, so that during movement of the gripping member 21 in a direction toward the planet guide rollers 16, 17, the conical surfaces 10A and 24A will engage and cause the two halves 14,15 of the bearing part to be pressed together. Since the planet guide rollers 16,17 are secured to these halves, the planet guide rollers 16,17 are also at the same time moved toward one another, and, if a welding wire is inserted therebetween, are pressed against its surface. Thus the contact pressure on the welding wire can be adjusted sensitively by the relative movement between the gripping member 21 and bearing part 10.

A cylindrical sleeve 26 is secured by means of two screws 25 to the gripping member 21 and extends coaxially therewith and beyond one end thereof and terminates at a free end. The free end of the sleeve is closed off by an end plate 27. A bearing 28 is inserted into a central opening in the plate 27, the inside diameter of which bearing is chosen so that it receives an inlet nozzle 29 therethrough, the free end 30 of which, just as with the free end 31 of the nozzle 9, terminates close to the planet guide rollers 16,17. Through this construction, a precise guiding of the welding wire in the region of the planet guide rollers is achieved, which is not the case in conventional linear drive arrangements. If the precise guiding of the welding did not take place, it could happen that the welding wire would travel laterally out of engagement with the planet guide rollers and that no conveying would take place. To fix such a breakdown is extremely time consuming.

The exemplary embodiments of a linear drive arrangement 1 illustrated in FIGS. 3 and 4 differs from the aforedescribed substantially in the design of the bore 23 in the gripping member 21 and in the construction of the surface of the slotted part of the bearing part 10.

The gripping member 21 is provided in the exemplary embodiment according to FIGS. 3 and 4 with a smooth internal surface bore 23 as opposed to the stepped internal surface in FIGS. 1 and 2. The bore has a very precise diameter which corresponds with a wire diameter. The external surface of the bearing part 10 is cylindrical in construction in the region of the bore 23. Furthermore, the bearing part 10 has a stop 37, which rests on the gripping member 21, when the required spacing between the planet guide rollers 16,17 is reached. However, it is also in this case conceivable to design the outer surface of the bearing part 10 conically. The stop 37 would also in this case assure an exact adjustment of the planet guide rollers. To adjust the guide rollers, in both cases it would only be necessary to tighten the nut 22 until the stop 37 on the bearing part 10 rests on the gripping member 21.

The exemplary embodiment of a linear drive arrangement illustrated in FIGS. 5 and 6 differs from the aforementioned ones substantially in the design of the gripping member 21 which, in this embodiment, is constructed as a split guide ring. The guide ring 21 is illustrated in FIG. 6. The guide ring is compressed in a conventional manner with the help of a screw 38. An adjustment of the linear drive arrangement is made considerably easier when the inside diameter of the guide ring 21, when the screw 38 is completely tightened, namely when the slot 32 is zero, corresponds with the required adjustment of the drive arrangement. As can be recognized from FIG. 5, the inside bore of the guide ring 21 is constructed slightly conically in opposing directions to define a ring of minimum diameter 21A. The ring of minimum diameter is received in an undercut section 35 in the bearing part 10, through which a secure holding of the guide ring 21 is obtained.

In contrast to the above discussed exemplary embodiments, the inlet nozzle 29 is held only in the wall 6 of the flange 4. Of course, it would also be possible in this exemplary embodiment to support the front end of the inlet nozzle 29 in a further bearing 28, which would be arranged similarly to the exemplary embodiments described above. The spacing between the legs of the U-shaped flange 4 is covered by a lid 36.

The gripping member 21 can, in particular if it is constructed as a guide ring, be provided with a ring spring, which urges the planet guide rollers with a constant pressure against the welding wire. With this construction, a balance at very high wire diameter tolerances is achieved. It is also possible to arrange such a spring on the bearing part.

Of course it is also possible to convey with the inventive linear drive arrangements welding wires of considerably different wire diameters, which is easily possible in the embodiment with a guide ring or, however, with a conical outer surface of the bearing part without a stop, however, it has been proven as advantageous to design linear drive arrangements only for a narrowly limited range of wire diameters. The inventive linear drive arrangements are adjusted to a very precise wire diameter by the manufacturer, so that during operation adjusting work is no longer necessary. Since moreover the spring paths for the planet guide rollers are only very small, threading of a new wire into the linear drive arrangement can occur without creating special difficulties. The planet guide rollers are urged apart by the wire. An inventive linear drive arrangement thus does not need any adjusting work by the user.

In the exemplary embodiment which is illustrated in FIGS. 7 and 8, the same parts are identified with the same reference numerals. This exemplary embodiment differs from the preceding ones in that the gripping member consists of a spacing sleeve 40, which has an internal thread therein, into which two screws 41 and 42 are threadedly received. The spacing sleeve 40 is inserted into a radially extending bore 43 of the bearing part 10 and extends through the two halves 14 and 15 of the bearing part 10 as shown in FIG. 8. At the ends of the sleeve 40 the bore 43 enlarges to a larger sized bore 44 and 45. The head of the screws 41 and 42 is chosen of such a size that same rests on the halves 14,15 of the bearing part.

As can best be seen from FIGS. 7 and 8, the spacing sleeve 40 has a central bore 46, through which the welding wire to be transported including the nozzle 9 extends.

The position of the planet guide rollers 16 and 17 is adjusted by turning the screws 41,42 into the internally threaded spacing sleeve 40. Through this construction, the screw heads 41,42 urge the halves 14,15 of the bearing part 10 toward each other, as well as facilitate a movement away from each other, until the planet guide rollers 16,17 rest with the desired amount of pressure on the welding wire. Thus it is assured that same spacing is maintained also in the case of high speeds.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a planet guide roller feed arrangement for advancing a meltable guide wire, including at least two planet guide rollers, first means for supporting said guide rollers at circumferentially spaced locations about the axis of said wire, the axis of each said roller being skewed at an acute angle with respect to the axis of said wire and each said guide roller being movable in a direction substantially radially of said wire, second means for urging said rollers into engagement with said wire, and drive means for effecting rotation of said guide rollers around the axis of said wire, the improvement comprising a sleevelike bearing part having at least two slots therein which extend axially from one end thereof a portion of the length thereof, said slots defining at least two axially extending, resiliently flexible arms, each said guide roller being supported on a respective one of said arms adjacent said one end of said bearing part, said wire extending substantially coaxially through said bearing part and said second means being engageable with said arms for flexing them radially inwardly until said guide rollers engage said wire.

2. The feed arrangement of claim 1, wherein said second means includes a gripping member which surrounds and is supported for axial movement relative to said bearing part, and including third means on said gripping member and bearing part for effecting said radial inward movement of said bearing part arms and said guide rollers in response to said relative axial movement between said gripping member and said bearing part.

3. The feed arrangement of claim 2, wherein said third means includes said gripping member having a cylindrical bore of precise inside diameter and said arms of said bearing part each having an arcuate outer surface, the portions of said arms having said outer surfaces thereon being received within said bore in said gripping member when said gripping member is moved axially of said bearing part in a first direction, and said arms being flexed radially inwardly to a position in which said guide rollers firmly engage said wire when said outer surfaces on said arms are received within and disposed against the inner surface of said bore.

4. The feed arrangement according to claim 3, wherein said third means includes said bearing part having stop means for limiting the axial movement of said bearing part relative to said gripping member.

5. The feed arrangement according to claim 2, wherein said third means includes at least a portion of the outer surface of said bearing part being conical in the region of said arms thereof, and includes surface means on said gripping member for engaging said conical surface on said bearing part and moving said arms radially inwardly as said gripping member is moved axially of said bearing part.

6. The feed arrangement of claim 5, wherein said surface means on said gripping member is a conical surface.

7. The feed arrangement according to claim 2, wherein said gripping member has a threaded opening and the end of said bearing part remote from said planet guide rollers is provided with an external thread which engages said threaded opening in said gripping member, and wherein rotation of said gripping member relative to said bearing part is prevented by a nut which is screwed onto said external thread of said bearing part and is disposed against said gripping member.

8. The feed arrangement according to claim 2, wherein a nozzle for guiding said welding wire is disposed in said bearing part and terminates adjacent said planet guide rollers.

9. The feed arrangement according to claim 8, wherein said nozzle has a flange which engages a shoulder of said bearing part, said drive means includes a rotationally driven shaft, and said bearing part is threadedly coupled to said shaft.

10. The feed arrangement according to claim 8, including a sleeve which encloses said planet guide rollers and has one end mounted to said gripping member, the opposite end of said sleeve including an end plate having an opening in which a bearing which encircles the welding wire is mounted, and including an inlet nozzle for the welding wire extending through said bearing.

11. The feed arrangement according to claim 1, wherein said second means includes at least one spring for urging said planet guide rollers toward said wire.

12. The feed arrangement of claim 1, wherein said second means includes a split guide ring which encircles and engages said bearing part arms, and including means cooperable with said ring for reducing the inside diameter thereof, thereby effecting said radially inward flexing of arms and said movement of said guide rollers into engagement with said wire.

13. The feed arrangement according to claim 1, wherein said bearing part has two said arms, has a radial bore which extends through said arms, and has an outwardly facing shoulder in said bore on each said arm, wherein said second means includes a spacing sleeve which is provided with an internal thread and is arranged in said bore in said bearing part, including two screws threadedly engaging respective ends of said spacing sleeve, the heads of said screws being supported on said shoulders on said arms of said bearing part, and wherein said spacing sleeve is provided with a transverse bore through which extends said welding wire.

* * * * *

UNITED STATES PATENT AND TRADEMARK OFFICE
CERTIFICATE OF CORRECTION

PATENT NO. : 4 333 594
DATED : June 8, 1982
INVENTOR(S) : Erwin Cloos

It is certified that error appears in the above—identified patent and that said Letters Patent is hereby corrected as shown below:

Col. 6, line 59; change "claim 8" to ---claim 9---.

Signed and Sealed this

Twelfth Day of October 1982

[SEAL]

Attest:

GERALD J. MOSSINGHOFF

Attesting Officer     Commissioner of Patents and Trademarks